United States Patent
Chan et al.

(10) Patent No.: US 11,499,020 B2
(45) Date of Patent: Nov. 15, 2022

(54) ARTICLE REINFORCED BY MULTI-DIMENSIONAL FIBERS AND METHOD FOR MANUFACTURING THE ARTICLE

(71) Applicant: TOPKEY CORPORATION, Taichung (TW)

(72) Inventors: Liang-Chieh Chan, Taichung (TW); Yung-Cheng Liu, Taichung (TW); Jung-Chin Yang, Taichung (TW)

(73) Assignee: TOPKEY CORPORATION, Taichung (TW)

( * ) Notice: Subject to any disclaimer, the term of this patent is extended or adjusted under 35 U.S.C. 154(b) by 178 days.

(21) Appl. No.: 16/876,162

(22) Filed: May 18, 2020

(65) Prior Publication Data

US 2021/0355288 A1    Nov. 18, 2021

(51) Int. Cl.
  *C08J 5/04* (2006.01)
(52) U.S. Cl.
  CPC ............. *C08J 5/0405* (2021.05); *C08J 5/041* (2013.01); *C08J 5/046* (2013.01); *C08J 2300/22* (2013.01); *C08J 2400/24* (2013.01); *C08J 2463/00* (2013.01)
(58) Field of Classification Search
  None
  See application file for complete search history.

(56) References Cited

FOREIGN PATENT DOCUMENTS

JP    2016527112    *  9/2016

OTHER PUBLICATIONS

Machine translation of JP2016527112 (Year: 2016).*

* cited by examiner

*Primary Examiner* — Shawn Mckinnon
(74) *Attorney, Agent, or Firm* — Bacon & Thomas, PLLC

(57) ABSTRACT

In order to solve problems of strength and volume of part, the invention provides an article reinforced by multi-dimensional fibers and a method for manufacturing the article. The article includes a core portion and a shell layer portion. The core portion is made of thermoplastic resin and the fibers in which a majority of and a minority of the fibers are respectively arranged in a major and a minor directions. The method includes: preparing a core portion made of thermoplastic resin and the fibers in which a majority of and a minority of the fibers are respectively arranged in a major and a minor directions, loading the core portion into a mold, and forming a shell layer portion in the mold to enclose the core portion. The article manufactured by the method of this invention can reduce the weight and increase the strength of the parts.

8 Claims, 4 Drawing Sheets

ARTICLE REINFORCED BY MULTI-DIMENSIONAL FIBERS AND METHOD FOR MANUFACTURING THE ARTICLE

FIELD OF THE PRESENT INVENTION

This invention generally relates to an article having a core portion reinforced by multi-dimensional fibers and a method for manufacturing the article. Especially, the resin in the core portion is thermoplastic.

BACKGROUND OF THE PRESENT INVENTION

Traditional mechanical parts usually include blanks, which are either made of metallic material to provide strength for the mechanical parts or made of non-metallic robust core to provide strength for the mechanical parts and enclosing layers which are made of plastic material to provide aesthetic appearance for the finished products of the mechanical parts.

However, such traditional mechanical parts are heavy or lack stiffness at particular angle due to the weight of metallic material or reinforced angle limitation so that they are not popular with, for examples, biking hobbies.

Besides, when a traditional mechanical part bears several external forces respectively in different directions, the only way to meet the force requirements of the mechanical part is to increase the amount of metallic material or non-metallic robust core in the directions of the external forces, which will increase the volume and weight of the mechanical part at the same time.

SUMMARY OF THE PRESENT INVENTION

Accordingly, this invention relates to an article having a core portion reinforced by multi-dimensional fibers and a method for manufacturing the article that are substantially intended to obviate one or more of the problems due to the limitations and disadvantages encountered in prior arts.

One object of this invention is to provide an article whose weight is reduced while having good and better strength performance.

Another object of this invention is to provide an article whose volume is reduced while having good and better strength performance.

Yet another object of this invention is to provide an article in which voids or pin holes are less.

A further object of this invention is to provide a method for manufacturing a light and small-sized article with good and better strength performance.

Another object of this invention is to provide a method for manufacturing an article with a complicated profile.

These objects are achieved by an article reinforced by multi-dimensional fibers as defined by claim 1 and a method for manufacturing an article reinforced by multi-dimensional fibers as defined by claim 7. The dependent claims define preferred or advantageous embodiments of the article and the method.

Additional features and advantages of the present invention will be set forth in the description which follows, and in portion will be apparent from the description, or may be learned by practice of the present invention. The objectives and advantages of the present invention will be realized and attained by the structure as particularly set forth in the written description and claims as well as illustrated in the appended drawings.

To achieve these and other advantages and according to the purpose of this invention, as embodied and broadly described, an article reinforced by multi-dimensional fibers and a method for manufacturing the article are provided.

The article of this invention comprises: a core portion made of a fiber reinforced plastic composite in which a majority of the fibers are deliberately arranged in a major direction to bear a first external force; and a shell layer portion enclosing the core portion. The article of this invention is characterized in that: a first minority of the fibers of the core portion are deliberately arranged in a first minor direction, which is different from the major direction, to bear a second external force which is different from the first external force; and the fiber reinforced plastic composite is formed with the fibers and a thermoplastic resin.

It is another preferred feature that the core portion is twisted.

Moreover, a second minority of the fibers of the core portion are deliberately arranged in a second minor direction, which is different from the major direction and the first minor direction, to bear a third external force which is different from the first and second external forces.

Additionally, the fibers in the core portion are selected from a first group consisted of inorganic fibers, metallic fibers, ceramic fibers, organic fibers, natural fibers, synthetic fibers, and a combination thereof.

Furthermore, the resin in the core portion (11) is selected from a second group consisted of PE, PP, ABS, PC, PET, PA, PPS, PSU, PPSU, PESU, PEI, PAEK, PEKK, PEEK, and a combination thereof.

It is preferred that the shell layer portion is made of materials selected from the first group and the second group, or made of thermoset resin selected from a third group consisted of epoxy resin and phenolic resin. Another aspect of this invention directs to a method for manufacturing an article reinforced by multi-dimensional fibers.

The method of this invention comprises: preparing a core portion made of a fiber reinforced plastic composite in which a majority of the fibers are deliberately arranged in a major direction to bear a first external force; loading the core portion into a mold; forming a shell layer portion in the mold to enclose the core portion. The method of this invention is characterized in that: forming the fiber reinforced plastic composite with the fibers and a thermoplastic resin; and deliberately arranging a minority of the fibers of the core portion in a first minor direction, which is different from the major direction, to bear a second external force which is different from the first external force.

It is another preferred feature that the method further comprises a step of twisting the core portion.

Moreover, the method further comprises a step of preparing a composite blank with the fiber reinforced plastic composite to be processed into the core portion.

Additionally, the composite blank is processed into the core portion by another mold or a shaping machine.

Furthermore, the core portion and the shell layer portion are formed by a temperature in a range of 70° C. to 490° C. under a pressure in a range of 0.1 kg/cm$^2$ to 80 kg/cm$^2$.

It is to be understood that both the foregoing general description and the following detailed description are exemplary and explanatory and are intended to provide a further non-limiting explanation of the present invention as claimed.

BRIEF DESCRIPTION OF THE DRAWINGS

The accompanying drawings, which are included to provide a further understanding of the present invention and constitute a portion of the specification, illustrate embodiments of the present invention and together with the description serve to explain the principle of the present invention. In the drawings.

DETAILED DESCRIPTION OF THE PRESENT INVENTION

Figure 1:
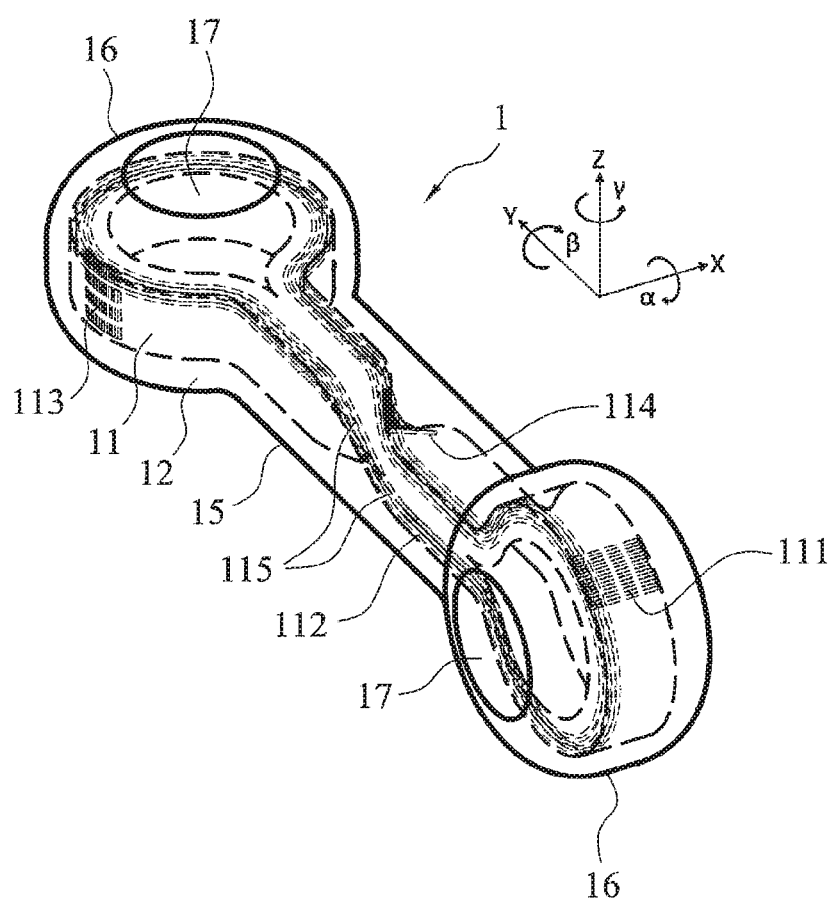
FIG. 1 is a perspective view illustrating an article reinforced by multi-dimensional fibers according to this invention.

FIG. 1 shows an article 1 of this invention which is, for example, a link used in a brake or suspension assembly of a bike. The article 1, in the aspect of structure, may comprise a stem portion 15, two end portions 16 situated at two opposite ends of the stem portion 15, and two holes 17 respectively formed in the centers of the two end portions 16. The central axes of the two holes 17 are differently oriented by 90 degrees. Specifically, one central axis is in a direction X while the other is in a direction Z.

The article 1, in the aspect of material, may comprise a core portion 11 which is reinforced by deliberately arranging fibers therein in predetermined sites and directions, instead of random directions, and a shell layer portion 12 which may completely or partially enclose the core portion 11.

The core portion 11 may be made of a fiber reinforced plastic composite which is formed with fibers and resin. The fibers mixed in the core portion may be inorganic fibers (such as carbon fibers, glass fibers, mineral fibers [for example Basalt fibers], - - - and etc.), metallic fibers (such as copper fibers, - - - and etc.), ceramic fibers, organic fibers (such as Kevlar fibers, - - - and etc.), natural fibers (such as cellulose fibers, - - - and etc.), synthetic fibers (such as polypropylene fibers, - - - and etc.), - - - or combination of one or more kinds of aforementioned fibers. Just a few kinds of fibers are listed here and this invention is not limited to those.

The resin used in the core portion 11 may be thermoplastic resin which is PE (Polyethylene), PP (Polypropylene), ABS (Acrylonitrile-Butadiene-Styrene), PC (Polycarbonate), PET (Polyester), PA (Polyamide), PPS (Polyphenylene sulfide), PSU (Polysulfone), PPSU (Polyphenylsulfone), PESU (Polyethersulfone), PEI (Polyetherimide), PAEK (Polyaryletherketone), PEKK (Polyetherketoneketone), PEEK (Polyetheretherketone), - - - or combination (alloy) of one or more kinds of aforementioned resin. Just a few kinds of resin are listed here and this invention is not limited to those.

Most of or the majority of the fibers in the core portion 11 are deliberately arranged in a majority direction. For example, fibers 112 in the stem portion 15 are deliberately arranged in a direction Y, and fibers in the end portions 16 are deliberately arranged along their circular peripheries. However, except the fibers in the majority direction, a fraction of or a minority of the fibers in the core portion 11 of this invention may be deliberately arranged at proper sites and in at least one minor direction different from the major direction or in directions of rotation, depending on requirements of design, to provide good strength at the sites and the minor direction for bearing external forces in different directions. For example, fibers 111 is deliberately arranged in the first minor direction X to bear an external force (not shown) in the direction X, fibers 113 in the second minor direction Z to bear an external force in the direction Z, fibers 114 in the fourth minor direction X-Y-Z (i.e. inclined to X, Y and Z coordinate axes) to bear an external force in the direction X-Y-Z, and fibers 115 in the β direction of rotation surrounding the Y axis due to the central axes of the two holes 17 differently oriented by 90 degrees. Hence, the article 1 or the core portion 11 is reinforced by fibers deliberately arranged in multiple dimensions.

If necessary for design, some other minority of fibers may be deliberately arranged in direction X, Y, Z or X-Y-Z at weak sites of the core portion 11 different from what have been shown in FIG. 1 so as to properly reinforce the article 1 or the core portion 11 at proper sites and in proper directions. Besides, the fibers of the core portion 11 in the articles used in other products or industrial fields may be rotated in α (rotating around the X axis) or β (rotating around the Y axis) or γ (rotating around the Z axis) direction of rotation.

The shell layer portion 12 may be made of one or more kinds of aforementioned resin used in the core portion 11, or made of one or more kinds of aforementioned fiber reinforced plastic composites used for the core portion 11. The fibers in the shell layer portion 12 may be arranged randomly ﹑ pseudo-unidirectional or in a way similar to that for the core portion 11. Besides, the resin used in the shell layer portion 12 or the fiber reinforced plastic composites used for the shell layer portion 12 may be thermoset resin such as epoxy resin, phenolic resin, and etc. Just a few kinds of thermoset resin are listed here and this invention is not limited to those.

The method for manufacturing the article of this invention may comprise the following steps.

Step 1

Thin and slender fibers are cut to have predetermined lengths. The majority of the cut fibers are deliberately arranged in the major direction and the minority of the cut fibers are deliberately arranged in the minor directions and then mixed, stacked or staggered with resin in a trough-shaped cavity of the first mold (not shown). Subsequently, the material in the first mold is heated at a temperature in a range of 70° C. to 490° C. under a pressure in a range of 0.1 kg/cm² to 80 kg/cm² to make the resin melted. After the first mold is cooled, the resin consolidates and fixes all fibers together to form a three-dimensional profile, such as a cuboid composite bar shown in FIG. 2, similar to the cavity of the mold. The cuboid bar is a composite blank 13 for a core portion 11 of an article 1.

Step 2

Figure 3:
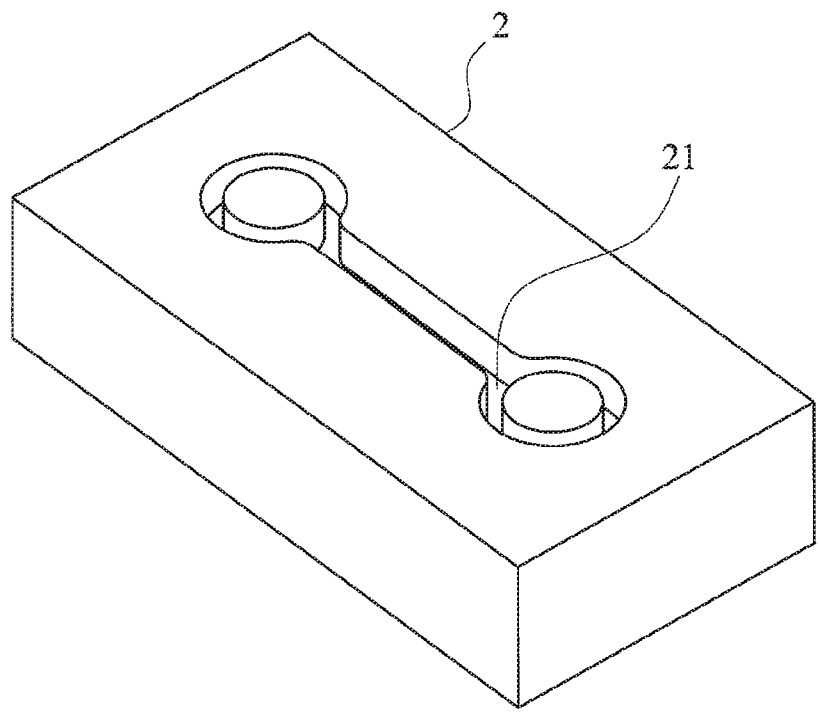
FIG. 3 a perspective view illustrating a mold for forming a core portion according to this invention.
Figure 4:
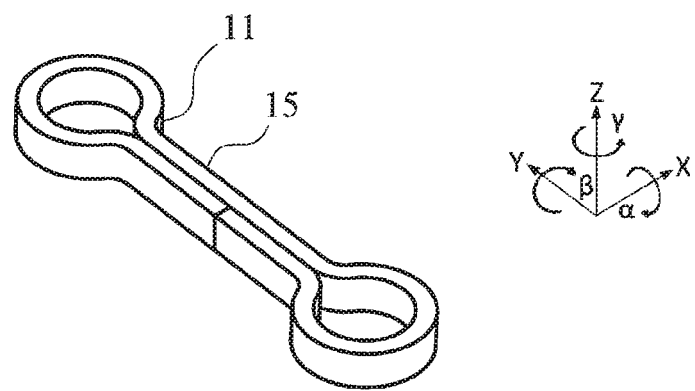
FIG. 4 a perspective view illustrating a core portion according to this invention which is formed by the mold of FIG. 3.

When a core portion 11 of an article 1 is needed, the composite blank 13 may be formed and loaded into the second mold 2 shown in FIG. 3 with a cavity 21 whose shape is similar to that of the article 1. If necessary, heat may be provided to soften the composite blank 13 to facilitate it in compliance with the shape of the cavity 21. When the composite blank 13 is shaped, the fibers in the composite blank 13 may be shaped in X-Y plane. The second shaping mold 2 is then heated at a temperature in a range of 70° C. to 490° C. under a pressure in a range of 0.1 kg/cm$^2$ to 80 kg/cm$^2$ to melt the resin in the blank. After the second mold 2 is cooled, the composite blank 13 has been reshaped into a continuous and endless blank called as the core portion 11, such as shown in FIG. 4, of the article 1. Alternatively, the composite blank 13 may be reshaped into the core portion 11 by shaping machines with previously conditions cooperating with jigs through one or more shaping steps.

If the core portion 11 is manufactured through a mold instead of shaping machines, the fibers and resin of step 1 may be directly arranged in the cavity 21 of the second mold 2. In other words, the step 1 and step 2 are combined into a single one step.

Figure 5:
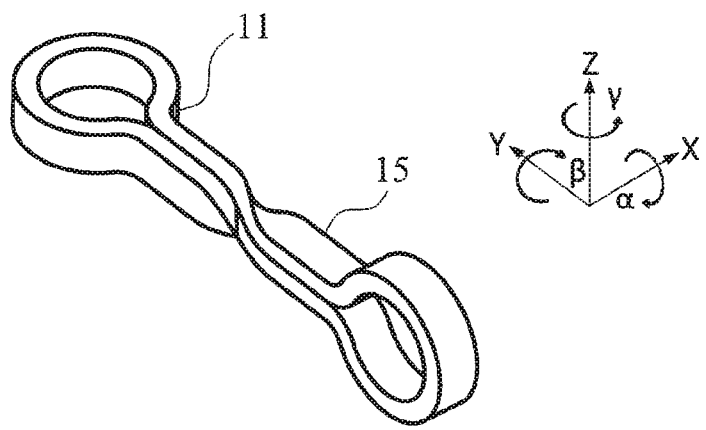
FIG. 5 a perspective view illustrating a core portion according to this invention which is different from that showing in FIG. 4 by a twist.

The core portion 11 shown in FIG. 5 is different from the core portion 11 shown in FIG. 4 in that the stem portion 15 in FIG. 5 is twisted 90 degrees in the β direction of rotation and the fibers near the twisted point may also be twisted. The core portion 11 shown in FIG. 5 may be manufactured by directly arrange the blank 13 in the third mold (not shown) with a cavity whose shape is similar to that of the core portion 11 shown in FIG. 5, or by twisting the core portion 11 shown in FIG. 4 by 90 degrees in the β direction of rotation. If the core portion 11 shown in FIG. 4 is manufactured by shaping machines, the core portion 11 shown in FIG. 4 may be twisted into the core portion 11 shown in FIG. 5 by an additional shaping step.

Step 3

The core portion 11 shown in FIG. 5 is put into and fixed in the fourth mold (not shown). Aforementioned material for the shell layer portion 12 is then injected or placed into the fourth mold to completely or partially, depending on requirements of design, enclose the core portion 11. The fourth mold is subsequently heated at a temperature in a range of 70° C. to 490° C. under a pressure in a range of 0.1 kg/cm$^2$ to 80 kg/cm$^2$ to melt the resin. After the fourth mold is cooled, the resin transform to form the outer profile of the shell layer portion 12 or the article 1 shown in FIG. 6 while adhering the shell layer portion 12 to the core portion 11.

If the fibers in the shell layer portion 12 are desired to arranged in predetermined directions so as to further reinforce the article 1 in predetermined sites and directions, the fibers of the shell layer portion 12 can be introduced merely by deliberately placing into the forth mold instead of injection which can just provide the fibers in random directions or in a pseudo-unidirection.

Figure 6:
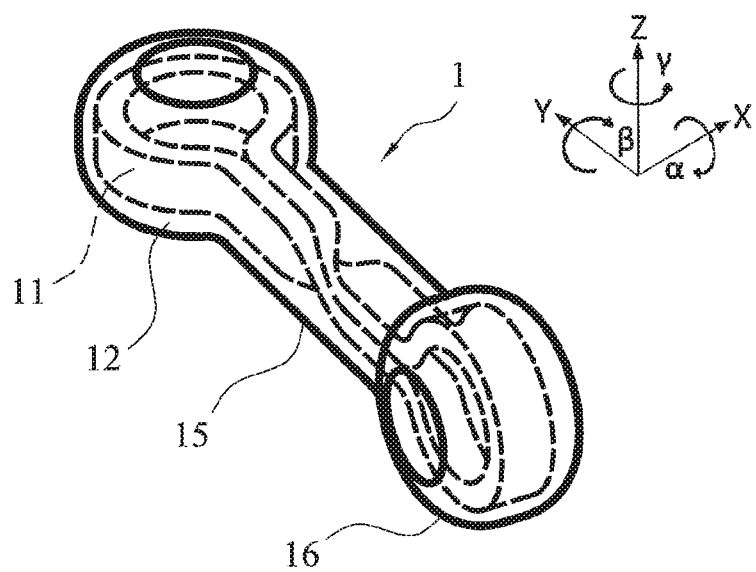
FIG. 6 is a perspective view illustrating an article reinforced by multi-dimensional fibers according to this invention in which the directions of fibers are not shown.

The article 1 shown in FIG. 1 is different from that shown in FIG. 6 in that the fibers 111, 113, 114 and 115 respectively and deliberately arranged in minor directions including X, Z, X-Y-Z and β directions are shown in FIG. 1 except the fibers 112 in the major direction including the direction Y at the stem portion 15 and around the circular peripheries at the end portions 16.

In brief, the method for manufacturing the article 1 of this invention may comprise the following steps: preparing a fiber reinforced plastic composite as a composite blank 13 formed with thermoplastic fibers and some resin, processing the composite blank 13 to become a core portion 11 with a predetermined shape, twisting the core portion 11 to become another shape (if necessary and depending on the profile of the article 1), putting the core portion 11 into a mold, introducing some other resin or together with other (thermoplastic or thermoset) fibers into the mold, heating the mold at a predetermined temperature and under a predetermined pressure to form a shell layer portion 12 which enclosing the core portion 11, cooling the mold, and taking the article 1 out of the mold.

During the preparing step, the majority of the fibers are deliberately arranged in a major direction, such as the direction Y, for bearing an external force in the major direction in the resulting article 1. Besides, additional (or a minority of) fibers may be deliberately arranged in at least one minor direction such as the directions X, Z or X-Y-Z, which is different from the major direction, at predetermined sites of the composite blank 13 for bearing an external force or providing support in the at least one minor direction in the resulting article 1. Alternatively, the additional fibers may be arranged after the processing step.

During the processing step, the core portion 11 may be twisted by a determined angles in one or more directions (α, β, or γ) of rotation.

Advantages

The article 1 manufactured by the method of this invention is light because the core portion is made of fiber reinforced plastic composite instead of metal or more volume of traditional composite.

Moreover, the dimensions of the article 1 manufactured by the method of this invention are small because the article 1 can be reinforced by deliberately arranging the fibers in the directions of external forces.

Furthermore, the void content in the article 1 manufactured by the method of this invention is less and thus the article 1 has higher strength. Because the core portion 11 of the article 1 of this invention is made of thermoplastic resin and the physical morphological changing of heating and cooling thermoplastic resin results in no or less bubbles, the void content in the article is less than that in the article made of other composite material, especially the material with thermoset resin.

Figure 2:
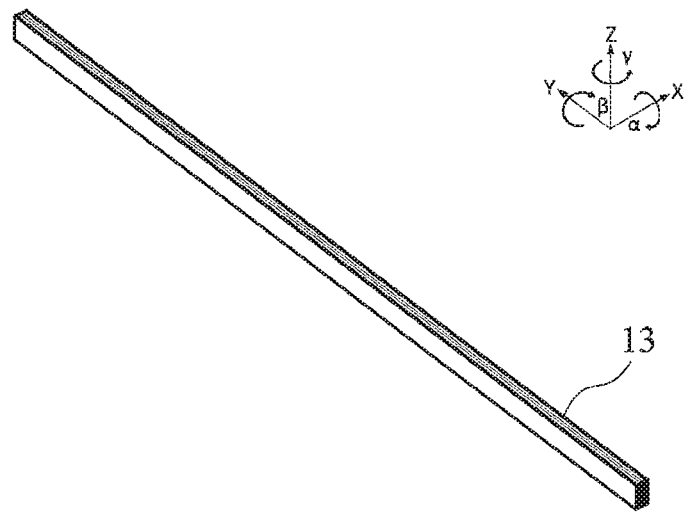
FIG. 2 is a perspective view illustrating a blank made of a fiber reinforced plastic composite according to this invention.

Besides, the method of this invention is suitable for manufacturing an article with a complicated profile because the thermoplastic resin is used. If thermoset resin is used, it is difficult for the fiber reinforced composite with thermoset resin to be processed in compliance with the profile of the article because the rigidity of the thermoset resin. On the contrary, the thermoplastic resin used in the method of this invention can be softened by heating so that its shape can be easily changed. For example, if the composite blank 13 shown in FIG. 2 is made of the fiber reinforced composite with thermoset resin, the composite blank 13 will be difficult to be processed to have the shape of the core portion shown in FIG. 4, and especially cannot be twisted as shown in FIG. 5 because the core portion 11 will be broken.

This invention has been disclosed in terms of specific embodiments. It will be apparent that many modifications can be made to the disclosed structures and steps without departing from the present invention. Therefore, it is the intent of the appended claims to cover all such variations and modifications that are within the scope of this invention.

What is claimed is:

1. A method for manufacturing an article (1) reinforced by multi-dimensional fibers, the method comprising:
preparing a core portion (11) made of a fiber reinforced plastic composite in which a majority of the fibers are deliberately arranged in a major direction to bear a first external force;
loading the core portion (11) into a mold;
forming a shell layer portion (12) in the mold to enclose the core portion (11);

forming the fiber reinforced plastic composite with the fibers and a thermoplastic resin;

deliberately arranging a minority of the fibers of the core portion (11) in a first minor direction, which is different from the major direction, to bear a second external force which is different from the first external force; and twisting the core portion (11).

2. The method according to the claim 1, further comprising a step of preparing a composite blank (13) with the fiber reinforced plastic composite to be processed into the core portion (11).

3. The method according to the claim 2, wherein the composite blank (13) is processed into the core portion (11) by another mold or a shaping machine.

4. The method according to the claim 2, wherein the core portion (11) is formed at a temperature in a range of 70° C. to 490° C. under a pressure in a range of 0.1 kg/cm$^2$ to 80 kg/cm$^2$.

5. The method according to the claim 4, wherein the fibers in the core portion (11) are selected from a first group consisted of inorganic fibers, metallic fibers, ceramic fibers, organic fibers, natural fibers, synthetic fibers, and a combination thereof.

6. The method according to the claim 5, wherein the resin in the core portion (11) is selected from a second group consisted of PE, PP, ABS, PC, PET, PA, PPS, PSU, PPSU, PESU, PEI, PAEK, PEKK, PEEK, and a combination thereof.

7. The method according to the claim 6, wherein the shell layer portion (12) are made of material selected from the first group and/or the second group, or made of thermoset resin selected from a third group consisted of epoxy resin and phenolic resin.

8. The method according to the claim 7, wherein the shell layer portion (12) is formed by a temperature in a range of 70° C. to 490° C. under a pressure in a range of 0.1 kg/cm$^2$ to 80 kg/cm$^2$.

* * * * *